Dec. 6, 1966   B. P. STRONG   3,289,800
MULTIPLE CLUTCHES WITH FLOATING FRICTION BLOCKS
Filed Oct. 30, 1964   2 Sheets-Sheet 1
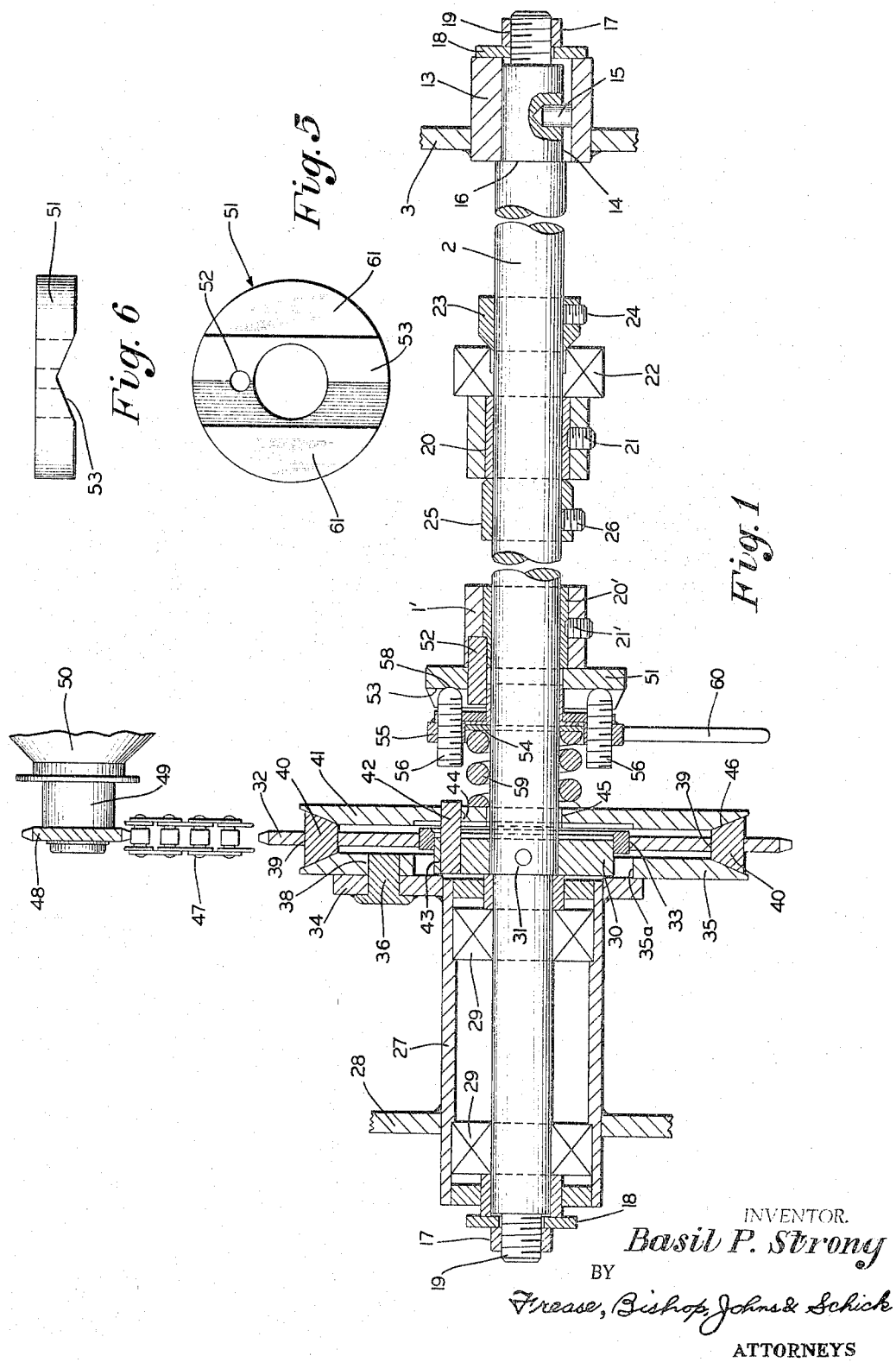
INVENTOR.
Basil P. Strong
BY
Frease, Bishop, Johns & Schick
ATTORNEYS Dec. 6, 1966   B. P. STRONG   3,289,800
MULTIPLE CLUTCHES WITH FLOATING FRICTION BLOCKS
Filed Oct. 30, 1964   2 Sheets-Sheet 2

INVENTOR.
Basil P. Strong
BY
Frease, Bishop, Johns & Schick
ATTORNEYS

United States Patent Office 3,289,800
Patented Dec. 6, 1966

3,289,800
MULTIPLE CLUTCHES WITH FLOATING FRICTION BLOCKS
Basil P. Strong, Atwater, Ohio, assignor to Atwater-Strong Company, Atwater, Ohio, a corporation of Ohio
Filed Oct. 30, 1964, Ser. No. 407,819
6 Claims. (Cl. 192—49)

The invention relates to clutches, and more particularly to a friction clutch.

A primary object of the invention is to provide a simple, easily operated, effective friction clutch for relatively small, power-operated, portable machines, such as blowers, mowers, and the like.

Another object of the invention is to provide such a clutch for driving two traction wheels, slippage in the clutch providing a differential action.

A further object of the invention is to provide a clutch of the character referred to comprising a sprocket wheel, or the like, operatively connected to driving means, and having a plurality of clutch blocks or segments slidably mounted through openings therein, a clutch plate on each side of the sprocket wheel, each clutch plate being operatively connected to one of the driving wheels, and means for relatively moving the clutch plates toward each other to frictionally engage opposite sides of the clutch blocks or segments.

A still further object of the invention is to provide a clutch of this type in which one drive wheel is fixed upon one end of a shaft and the hub of the other wheel is journalled upon the other end of the shaft, one clutch plate being operatively connected to the shaft and the other to said hub, and the sprocket wheel being rotatably located between the clutch plates.

Another object of the invention is to provide such a clutch in which the clutch plate on the shaft is mounted for longitudinal movement thereon, and spring means is provided for moving it toward the sprocket wheel.

The above and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be briefly described as comprising a friction clutch for providing a differential action in the driving wheels of a portable, power-driven machine, such as a blower for cleaning leaves, grass cuttings or the like from lawns, or for cleaning litter from stadiums or similar structures, or for cleaning snow from sidewalks and the like.

The device includes a shaft, with the hub of one drive wheel fixed upon one end of the shaft and the hub of the other drive wheel rotatably mounted upon the other end thereof. A drive hub is fixed upon the shaft, adjacent to the rotatable wheel hub, and a sprocket wheel or the like is rotatably mounted upon said drive hub and arranged to be connected, by drive chain or the like, with drive means such as a motor, preferably through suitable transmission means.

The sprocket wheel has a plurality of openings therethrough within which are slidably located clutch blocks or segments of friction material. An outer clutch plate, or disc, is fixed to the rotatable wheel hub and adapted to contact one side of the clutch blocks or segments on the sprocket wheel, and an inner clutch plate, or disc, is located on the other side of the sprocket wheel and fixed for slidable movement only upon the shaft.

For this purpose, pins are fixed in the drive hub and slidably located through apertures in said last-named clutch plate, or disc. A coil spring is interposed between said slidable clutch plate, or disc, and a clutch throw assembly, including a spring washer with round-ended studs or screws therein, engaging a cam plate and means for rotating the spring washer to compress the spring and frictionally operate the clutch.

The clutch blocks, or segments, of friction material are slidably located through openings in the sprocket wheel, so that the clutch blocks or segments will automatically adjust themselves for uniform frictional engagement with both clutch plates, or discs. The clutch blocks or segments are preferably tapered or inclined on opposite sides toward the center of the sprocket wheel, and the contacting faces of the clutch plates, or discs, are correspondingly tapered so as to provide a wedge action therebetween.

Referring now to the drawings:

FIG. 5 is an elevation of the face of the clutch cam plate;

FIG. 6 is an edge elevation of the same; and

FIG. 7 is a small perspective view of a portable power-driven blower of a type to which the clutch may be applied.

Figure 1:
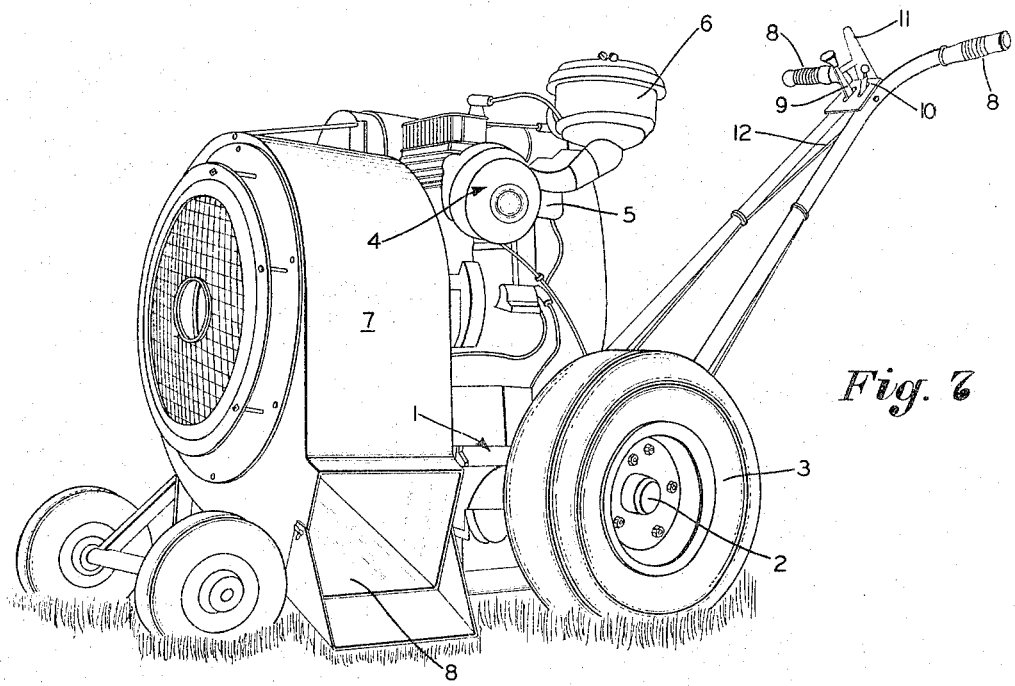
FIG. 1 is a longitudinal sectional view of a drive wheel assembly showing the clutch embodying the invention.
Figure 2:
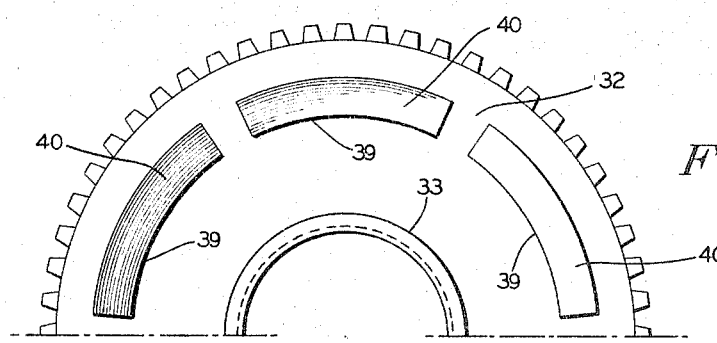
FIG. 2 is an elevation of one-half of the clutch sprocket wheel.

Referring now more particularly to the embodiment of the invention illustrated, in FIG. 7 is shown a portable, power-driven blower for cleaning leaves, grass cuttings and the like from a lawn, or for cleaning litter from stadiums or similar structures, or for blowing snow from sidewalks and the like.

The device includes a frame, indicated generally at 1, in which is journalled a shaft 2, upon which are located two driving wheels, one of which is indicated at 3. A drive motor, in the form of an internal combustion engine, is indicated generally at 4 with carburetor 5 and air cleaner 6. The engine is adapted to drive the drive wheels through the clutch mechanism to which the invention pertains, and also drives a fan within the fan housing 7, having discharge opening 8 through which a blast of air is driven for blowing leaves, grass cuttings, litter and the like to a central point for collecting.

Handles 8 of conventional construction are provided for guiding the machine when in use. Upon these handles are located the usual forward, neutral and reverse shift lever 9, engine speed control lever 10, and a slip clutch control lever 11, connected by link 12 to the clutch mechanism 1 which will later be described.

Referring now to FIG. 1 of the drawings, the wheel 3 is shown as welded upon the hub 13 which is provided with the interior longitudinal groove 14, receiving the outer end of the drive pin 15, in the adjacent end portion of the shaft 2, so as to fix the wheel 3 upon the shaft. The inner end of the hub 13, of the wheel 3, is held against the shoulder 16 of the shaft by means of the axle nut 17 and flat washer 18, mounted upon the reduced threaded outer end 19 of the shaft.

An intermediate portion of the shaft 2 is located through an axle bearing 20, held in a portion of the frame 1 as by the set screw 21 and through the adjacent axle thrust bearing 22. A thrust ring 23 is held on the shaft by set screw 24 and is located against the outer end of the axle thrust bearing 22, and a stop ring 25 is held upon the shaft 2 by a set screw 26 and located against the outer end of the axle bearing 20.

At the other end of the shaft 2 the hub 27, of the other drive wheel 28, is rotatably mounted upon this end portion of the shaft, as by the roller bearing 29. A flat washer 18 and axle nut 17 are mounted upon the reduced threaded end 19 of the shaft to retain the hub 27 thereon.

A drive hub 30 is fixed upon the shaft 2, adjacent to the wheel hub 27, as by the tension pin 31. The sprocket wheel 32 has a bearing 33 which has a 0.0010" to 0.0012" clearance upon the drive hub 30. A hub plate 34 is welded upon the inner end of the wheel hub 27, and the outer clutch plate 35 is connected to the inner surface thereof, as by the weld pins 36, located through openings 37 in the hub plate 34 and openings 38 in the outer clutch plate 35. As best shown in FIG. 1, there is a considerable clearance between the central opening 35a of the outer clutch plate 35 and the periphery of the drive hub 30.

The sprocket wheel 32 has a plurality of arcuate slots 39 therein, through which are located the segments 40, which are in the form of segmental blocks of friction material. These clutch segments are arranged to have a sliding fit through the openings 39 in the sprocket wheel.

The inner clutch plate 41 is located upon the inner side of the sprocket wheel 32 and is slidably connected to the drive hub 30, as by the groove pins 42 located through openings 43 in the drive hub and openings 44 in the inner clutch plate 41.

Figure 4:
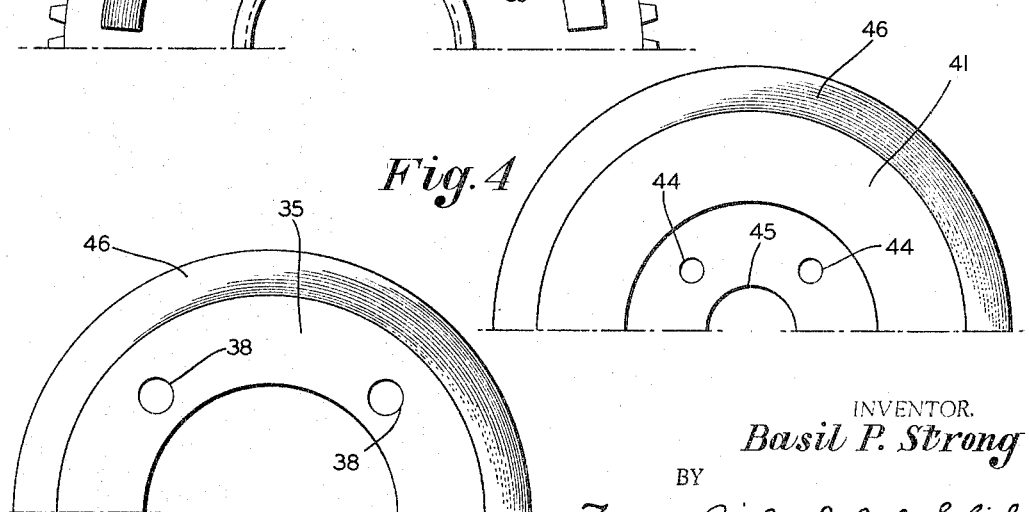
FIG. 4 is an elevation of one-half of the opposed surface of the inner clutch plate, or disc.
Figure 3:
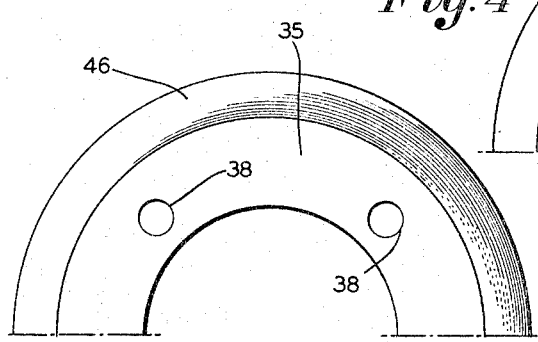
FIG. 3 is an elevation of one-shalf of the inner surface of the outer clutch plate, or disc.

It will be seen from FIG. 1 that the central opening 45 of the inner clutch plate has a clearance around the shaft 2. The clutch plates 35 and 41 are in the form of discs, as shown in FIGS. 3 and 4, and the opposed peripheral portions thereof are divergingly beveled, as indicated at 46, to accommodate the correspondingly beveled side faces of the clutch segments 40.

The clutch sprocket 32 is adapted to be operatively connected to the motor in any conventional manner. For instance, the sprocket chain 47 connects the sprocket wheel 32 to a sprocket wheel 48 upon the shaft 49 of a transmission assembly, a portion of which is indicated at 50. By any conventional means this transmission assembly may be operatively connected to the motor, but since this means in itself forms no part of the present invention, it is not thought necessary to illustrate the same.

At a point spaced inwardly from the inner clutch plate 41, the shaft 2 is journalled through an axle bearing 20' connected to a portion 1' of the frame. A clutch cam plate 51 surrounds the shaft 2, adjacent to the portion 1' of the frame, and is attached thereto as by a groove pin 52.

A shallow, V-shape groove 53 is formed in the face of the clutch cam plate 51. Slidably and rotatably mounted upon the shaft 2 is a clutch throw assembly, including a spring washer 54 and the ring 55 attached to the periphery thereof. A pair of screws 56 are threaded through tapped openings 57 in the ring 55 and provided with rounded ends 58 held in engagement with the adjacent face of the clutch cam plate 51 by the coil spring 59, interposed between the spring washer 54 and the inner clutch plate 41.

A radially disposed lever arm 60 is rigidly connected to the ring 55 and is attached by the link 12 to the slip clutch control lever 11 on the handles of the machine, as shown in FIG. 7.

With the machine standing still, the rounded ends 58 of the screws 56 rest in the center of the cam grooves 53 of the clutch cam plate 51, as best shown in FIG. 1. In this position, the coil spring 59 is not compressed, whereby the sprocket wheel 32 may rotate freely between the inner end outer clutch plates 55 and 41, respectively.

When the clutch control lever 11 is operated, to rotate the spring washer 54, so as to move the rounded ends 58 of the screws 56 out of the groove 53 of the clutch cam plate 51, and onto the inner surfaces 61 thereof, the coil spring 59 will be compressed, pushing the inner clutch plate 41 to the left, as viewed in FIG. 1, and, through the clutch segments 40, frictionally connecting the inner and outer clutch plates 35 and 41 and the sprocket wheel 32, whereby rotation of the sprocket wheel will cause rotation of the left wheel 28 of the vehicle, as viewed in FIG. 1, through the outer clutch plate 35, weld pins 36, hub plate 34 and wheel hub 27.

At the same time, rotation of the right wheel 3 of the vehicle, as viewed in FIG. 1, wil be caused through the inner clutch plate 41, groove pins 42, drive hub 30, shaft 2, drive pin 15 and wheel hub 13.

Since the clutch segments 40 have a sliding fit through the openings 39 in the sprocket wheel 32, they will automatically adjust themselves so that they will uniformly frictionally engage the opposed surfaces of both of the clutch plates, whereby each wheel of the vehicle will be driven uniformly.

At the same time it will be seen that when the machine makes turns, this friction clutch arrangement will permit one clutch plate to slip relative to the other, thereby permitting one wheel of the machine to rotate slower than the other, thus providing a differential action.

The screws 56, the round ends 58 of which engage the clutch cam plate, may be adjusted within the threaded openings 57 in the clutch throw assembly in order to compensate for wear in the clutch parts.

From the above it will be obvious that an easily operated and effective friction clutch is provided for various power-operated portable machines, whereby slippage may be allowed in the clutch, providing a differential action for moving the machine in curves.

It will also be seen that because of the sliding fit of the clutch segments within the openings provided therefor in the sprocket wheel, the clutch is self-adjusting, so as to provide for uniform friction upon the two clutch plates.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In combination with a rotatably mounted shaft and a hub rotatable thereon, clutch means comprising a clutch plate fixed upon said hub, a second clutch plate, means for mounting said second clutch plate for only longitudinal sliding movement on said shaft, opposed peripheral portions of the clutch plates being divergingly beveled, a sprocket wheel rotatably located between said clutch plates, there being spaced openings in said sprocket wheel, clutch blocks of friction material slidably located through said openings, opposite ends of said clutch blocks being beveled, and means for moving said second clutch plate toward the first named clutch plate for engaging the beveled ends of the clutch blocks between the beveled portions of the clutch plates and clamping said clutch blocks therebetween and thereby operatively connecting said shaft and said hub to said sprocket wheel.

2. In combination with a rotatably mounted shaft element and a hub element rotatable thereon, clutch means comprising a clutch plate fixed upon one of said elements, a second clutch plate, means for mounting said second clutch plate for only longitudinal sliding movement on the other element, opposed peripheral portions of the clutch plates being divergingly beveled, a sprocket wheel rotatably located between said clutch plates, there being spaced openings in said sprocket wheel, clutch blocks of friction material slidably located through said openings, opposite ends of said clutch blocks being beveled, and means for moving said second clutch plate toward the first named clutch plate for engaging the beveled ends of the clutch blocks between the beveled portions of the clutch plates and clamping said clutch blocks therebetween and thereby operatively connecting said shaft element and said hub element to said sprocket wheel.

3. In a portable motor-driven machine, an axle shaft rotatably mounted therein, a drive wheel, a hub for the drive wheel fixed to one end of the axle shaft, a second drive wheel having a hub rotatable upon the other end of the axle shaft, clutch means comprising a clutch plate fixed to the inner end of said rotatable hub, a second clutch plate, means for mounting said second clutch plate for only longitudinal sliding movement on said axle shaft, opposed peripheral portions of the clutch plates being divergingly beveled, a sprocket wheel rotatably located between said clutch plates, means for rotating said sprocket wheel, there being spaced openings in said sprocket wheel, clutch blocks of friction material slidably located through said openings, opposite ends of said clutch blocks being beveled, and a clutch throw assembly for moving said second clutch plate toward the first named clutch plate for clamping said clutch blocks therebetween and thereby frictionally connecting said axle shaft and said rotatable hub to said sprocket wheel for simultaneously rotating said drive wheels and permitting slippage of either drive wheel as the machine is turned in either direction.

4. In a portable motor-driven machine, an axle shaft rotatably mounted therein, a drive wheel, a hub for the drive wheel fixed to one end of the axle shaft, a second drive wheel, a hub for the second drive wheel rotatable upon the other end of the axle shaft, clutch means comprising a clutch plate fixed to the inner end of said rotatable hub, a drive hub fixed upon said axle shaft adjacent to the inner end of said rotatable hub, groove pins connected to said drive hub, a second clutch plate having apertures therein slidably receiving said groove pins, opposed peripheral portions of the clutch plates being divergingly beveled, a sprocket wheel rotatable upon said drive hub between said clutch plates, means for rotating said sprocket wheel, there being spaced openings in said sprocket wheel, clutch blocks of friction material slidably located through said openings, opposite ends of said clutch blocks being beveled, and a clutch throw assembly for moving said second clutch plate toward the first named clutch plate for engaging the beveled ends of the clutch blocks between the beveled portions of the clutch plates and clampingly engaging the beveled ends of the clutch blocks between the beveled portions of the clutch plates and said clutch blocks therebetween and thereby frictionally connecting said axle shaft and said rotatable hub to said sprocket wheel for simultaneously rotating said drive wheels and permitting slippage of either drive wheel as the machine is turned in either direction.

5. In a portable motor-driven machine, an axle shaft rotatably mounted therein, a drive wheel, a hub for the drive wheel fixed to one end of the axle shaft, a second drive wheel, a hub for the second drive wheel rotatable upon the other end of the axle shaft, clutch means comprising a clutch plate fixed to the inner end of said rotatable hub, a second clutch plate, means for mounting said second clutch plate for only longitudinal sliding movement on said axle shaft, a sprocket wheel rotatably located between said clutch plates, means for rotating said sprocket wheel, there being spaced openings in said sprocket wheel, clutch blocks of friction material slidably located through said openings, a cam plate surrounding the axle shaft and fixed to a stationary portion of the machine at a point spaced from said second clutch plate, said cam plate having a diametrically disposed groove in its outer surface, a spring washer rotatably mounted upon the axle shaft between said cam plate and said second clutch plate, pins mounted in said spring washer, a coil spring interposed between said second clutch plate and said spring washer, and means for rotating said spring washer for moving said pins out of said groove and onto the outer surface of said cam plate for moving said second clutch plate toward the first named clutch plate for clamping said clutch blocks therebetween and thereby frictionally connecting said axle shaft and said rotatable hub to said sprocket wheel for simultaneously rotating said drive wheels and permitting slippage of either drive wheel as the machine is turned in either direction.

6. In a portable motor-driven machine, an axle shaft rotatably mounted therein, a drive wheel, a hub fixed to one end of the axle shaft, a second drive wheel, a hub for the second drive wheel rotatable upon the other end of the axle shaft, clutch means comprising a clutch plate fixed to the inner end of said rotatable hub, a second clutch plate, means for mounting said second clutch plate for only longitudinal sliding movement only on said axle shaft, a sprocket wheel rotatably located between said clutch plates, means for rotating said sprocket wheel, there being spaced openings in said sprocket wheel, clutch blocks of friction material slidably located through said openings, a cam plate surrounding the axle shaft and fixed to a stationary portion of the machine at a point spaced from said second clutch plate, said cam plate having a diametrically disposed groove in its outer surface, a spring washer rotatably mounted upon the axle shaft between said cam plate and said second clutch plate, pins adjustably threaded in said spring washer, a coil spring interposed between said second clutch plate and said spring washer, and means for rotating said spring washer for moving said pins out of said groove and onto the outer surface of said cam plate for moving said second clutch plate toward the first named clutch plate for clamping said clutch blocks therebetween and thereby frictionally connecting said axle shaft and said rotatable hub to said sprocket wheel for simultaneously rotating said drive wheels and permitting slippage of either drive wheel as the machine is turned in either direction.

References Cited by the Examiner
UNITED STATES PATENTS

| 888,523 | 5/1908 | Bramley-Moore | 192—109 |
| 2,082,969 | 6/1935 | Myers | 192—68 |
| 2,670,065 | 2/1954 | Stevens | 192—18 |
| 2,814,372 | 11/1957 | Hussa | 192—48 |
| 3,207,251 | 9/1965 | Putnam et al. | 192—49 X |

DAVID J. WILLIAMOWSKY, *Primary Examiner.*

N. ABRAMS, *Assistant Examiner.*